May 30, 1939.　　　W. C. HARPER　　　2,160,359
OPHTHALMIC INSTRUMENT
Filed March 10, 1937　　　8 Sheets-Sheet 1

Inventor
Worthy C. Harper
By
Attorney

May 30, 1939.  W. C. HARPER  2,160,359
OPHTHALMIC INSTRUMENT
Filed March 10, 1937  8 Sheets-Sheet 3

Inventor
Worthy C. Harper.

May 30, 1939. W. C. HARPER 2,160,359
OPHTHALMIC INSTRUMENT
Filed March 10, 1937 8 Sheets-Sheet 4

Fig. 19

May 30, 1939. W. C. HARPER 2,160,359
OPHTHALMIC INSTRUMENT
Filed March 10, 1937 8 Sheets-Sheet 8

INVENTOR
Worthy C. Harper
BY Harry H. Styll
ATTORNEY

Patented May 30, 1939

2,160,359

UNITED STATES PATENT OFFICE 2,160,359

OPHTHALMIC INSTRUMENT

Worthy C. Harper, Caldwell, Ohio, assignor to American Optical Company, Southbridge, Mass., a voluntary association of Massachusetts Application March 10, 1937, Serial No. 130,164

15 Claims. (Cl. 88—20)

This invention is directed to a myologic instrument for orthoptic training and exercise of the coordinating visual apparatus of a pair of eyes through causing a reallotment of innervation to the eye muscles by the brain. This application is a continuation in part of my copending application Serial No. 11,881, filed March 19, 1935, for Myologic instruments. The instrument is designed for the correction of heterophoria, vertical and horizontal, development and refinement of fusion, controlling of accommodation, and testing and measuring duction and phoria. The instrument operates to cause a reallotment of innervation to the eye muscles by the brain by subjecting the eyes to an increase of prism power to balance the coordinated relationship between the accommodative and adductive functions.

Eye treatment for this result is recognized as standard practice. In such treatment, however, the eyes are subjected to an increase of prism power and maintained during treatment under such increased prism power. This continual subjecting of the eyes during treatment to this increased unrelieved and constant strain is productive of seriously objectionable fatigue and after-effects which, of course, gradually disappear but which necessarily limit each treatment to comparatively short periods and therefore increase the number of such treatments necessary to produce the desired result.

The primary object of the present invention is the provision of an instrument of this character in which, during treatment, the eyes are subjected momentarily to a strain period and then returned to a period of rest, the periods of rest and strain alternating and being automatically produced in the operation of the instrument. Thus, as the eyes are subjected to momentary strain and longer periods of rest alternately, constantly and successively produced, the fatigue and after-effects of the treatment are negligible so far as any disagreeable conditions are concerned and thus each particular treatment may be continued for a greater period of time than earlier possible, with the result of materially reducing the number of treatments required to reach the desired result.

A further object of the invention is the production of an apparatus in which the amount of prism power being used or capable of being used is completely within the control of the operator and can be adjusted to any desired maximum or minimum limit, with the further provision of means whereby the operator is visibly informed at all times of the amount of prism power being utilized.

A further object of the invention is the provision of an instrument of the above character having illuminating means for the respective fixation means which may be synchronously or alternately flashed and so arranged that the said synchronous or alternating flashes may be timed to take place at predetermined intervals or sustained for predetermined periods during the varying of the prism power before the eyes.

A further object of the invention is the provision of means for controlling accommodation during the eye treatments.

A further object of the invention is the provision of an instrument of this type wherein the amount of prism power is automatically and repeatedly varied to create the necessary motion of the eyes to widen the coordinated relationship or lock between the accommodative or adductive functions, thus permitting the operator to change the phorias and ductions in any direction that may be desired, the said prism power being variable or adjustable by controlled amounts during the operation of the instrument or when the said instrument is not in operation.

A further object of the invention is the use of scales and pointers, with the scales graduated according to the prism dioptry to permit the operator to be advised exactly of the amount of prism power being used at any period of treatment in the correction of both vertical and horizontal balance as well as the amount of automatic change in such power that is being used; this use of the scales and pointers permitting the operator to accurately follow any change in the prismatic power and thus be advised as to the extent of the phorias and ductions at any time.

A further object of the invention is the provision of an instrument of this character in which the test implement may be in the form of a revolving target illuminated by reflected light or a fixed translucent target illuminated by transmitted light, together with means for controlling the degree of illumination to suit the requirement of the eyes of the patient being treated.

A further object is to provide an instrument of the above character with adjustable mirrors for increasing or decreasing the prism power before the eyes and which may be tilted vertically if desired.

The invention in the preferred form is illustrated in the accompanying drawings, in which.

The instrument is mounted on a case 1 having an intermediate horizontal partition 2. The case is divided into an upper section 3 and a lower section 4, the partition 2 forming the bottom of the upper section. The forward wall of the case inclines inwardly from each end to a central opening 5 in the upper section and the top of the upper section is formed as a central fixed portion 6 coextensive with the opening 5, beyond which fixed portion the top includes the hinged cover portions 7. The rear part of the central fixed portion 6 has a hinged cover portion 8 closing an opening 9 in such fixed portion 6.

A bracket 10 vertically bridges the opening 5 at the central portion thereof, the lower end of the bracket being secured to the partition 3 and the upper end to a plate 11 bridging a recess 12 in the forward edge of the fixed portion 6 of the top. A bar 13 is pivotally supported intermediate its ends, as at 14, on the lower end of the bracket 10 which overlies and is secured to the partition 2. The forward end of the bar 13 is slotted to receive the lower end of a shaft 15, the upper end of which extends through an enlarged opening 16 in the plate 11. The lower end of the shaft 15 is guided in an arcuate slot 15' in the lower end of the bracket 10.

The shaft 15 supports the forward ends of mirrors 17 and 18, the opposite ends of the mirrors extending within the upper section of the case to dispose the mirrors in definite relation to brackets which will be later described. One of the mirrors, as 17, is rigidly secured to the shaft 15 through any appropriate connection while the other of the mirrors, as 18, is swingingly supported on the shaft 15. Mounted in alignment with the mirror support shaft 15 is a motor mechanism here shown as a clock-work 19 which is bodily adjustable toward and from the mirrors through the medium of a threaded rod 20 cooperating with a nut 21 secured to the rear wall of the case, the inner end of the rod being connected to the clock-work and the outer end being provided beyond the case with a finger wheel 22.

A shaft 23 of the clock-work 19 is provided on its upper end with a disk 24 on which is eccentrically pivoted at 25 a second disk 26. The disk 26 is provided with a pin 27 extending therethrough and adapted to engage any one of a series of openings 28 in the disk 24, whereby the degree of eccentricity of the second disk 26 may be selectively varied for a purpose which will later appear. Encircling the second disk 26, hereinafter termed the eccentric, is a band 29 connected by a rod 30 to one terminal of a bar 31, the opposite terminal of which is swingingly supported in the remote end wall of the case, the bar 31 being of considerable length to cause the free end to which the rod 30 is connected to move substantially in a straight line under the operation of the eccentric.

The free end of the bar 31 is connected by tie bars 32 to the respective mirrors 17 and 18 on the relatively adjacent or non-reflective surfaces and at points in advance of the pivotally supported ends of the mirrors. A spring 33 is interposed between the tie bars 32 to insure a proper spreading movement of the mirrors under the action of the eccentric.

From the above construction it will be understood that with the clock-work or other motor 19 in operation, the eccentric will cause the tie bars 32 to swing the mirrors on their pivotal support or shaft 15 toward and from each other in regular uniform degrees of movement and in regular uniform periods of time. The degree of movement may be changed at will by adjusting the eccentricity of the eccentric 26 through the use of a selected opening 28 but the period of time of movement remains the same, as predetermined by governor setting.

The ability to adjust the normal angular relation of the mirrors is a highly important detail of the present invention, as will later appear, and it is quite obvious that this angular relation may be mechanically changed through manual adjustment of the threaded rod 20, in which adjustment the motor, eccentric and connections between the eccentric and mirrors are bodily moved in one direction or the other with the result of varying the angular relation between the mirrors, as will be obvious.

A target 34 is mounted for rotation on each end wall of the upper section 3 of the case, the target being preferably in the form of a metal or other disk having a toothed periphery. Each target is, of course, within the reflective range of the adjacent mirror and on each target is preferably provided a distinctive vision area in the form of a jewel or like element 35, preferably though not necessarily distinctively and vividly colored. The jewel elements of the respective targets are set in relatively diametrically opposite positions.

Mounted in the forward wall adjacent each target and between the target and its mirror is a source of illumination in the form of an electric bulb 36 and the circuit 37 for each bulb is controlled by a switch 38 and includes a series of selective resistance 39 of any usual or conventional type manually controlled by a switch arm 40, so that either or both sources of illumination may be graded in intensity as desired.

Secured upon the shaft 15 immediately above the plate 11 is a toothed wheel 41 meshing with a barrel gear pinion 42 secured upon a shaft 43 supported at its lower end in the plate 11 and adjacent its upper end in an offset bracket 44 carried by the plate 11. Secured upon the upper end of the shaft 43 is a pointer 45, the free end of which plays over a scale 46, the divisions of which extend in both directions from a neutral or zero point and are graduated in exact accord with prism dioptry. A spring 47 coiled about the shaft 43 insures accuracy and steadiness of movement of the pointer.

In testing and training the eyes by the use of the present instrument, it frequently happens that the patient will indicate a condition of non-vertical balance, that is when the test reaches a point of diplopia, the two objects seen are not on substantially the same horizontal line. The present instrument provides for a correction of this condition within the instrument itself by changing the normal true horizontal relation of the mirrors to raise one image and correspondingly depress the other until a point of vertical balance is obtained. This is secured through physically shifting the lower end of the shaft 15 in one direction or the other to correspondingly shift the mirrors.

This is accomplished through a shaft 48 fixed at its lower end in the forward end of the bar 13 and extending through an opening in the upper portion of the bracket 10, with such opening permitting a slight swinging movement of the shaft. The upper end of the shaft is provided with a pointer 49 moving over a scale 50 graduated as is the scale 46. The pointer 49 is to be moved by hand and the resilient turning movement of the shaft 48, which is fixed at its lower end in the bar 13, will swing this bar on its pivot 14 and correspondingly swing the lower end of the shaft 15 and thus in accordance with the direction in which the pointer is moved and therefore the mirrors swung, the image seen by the right eye at the point of double vision or the image seen by the left eye at the point of double vision is moved either upwardly or downwardly so that the images seen at the point of double vision are adjusted to be on substantially the same horizontal line.

The opening 5 is bridged and substantially closed by a removable spectacle plate 51 formed with vision openings and with external supports 52 to removably receive a frame 53 in substantially eye-glass shape and carrying lenses 54 through which the patient views the reflections in the mirrors during the test and training. The removability of the frame 53 permits the application of lenses of different character and power if necessary to suit the eyes of the patient being treated at the moment.

In order to support the eyes in accurate position with respect to the lenses 54, a chin-rest 55 is arranged immediately below the plate 51 and adjustable for accuracy in positioning the eyes of a particular patient, that is the chin-rest is supported upon a rod 56 guided in a support on the lower edge of the case connected to a lever 57 pivotally supported on the bottom of the case and extending transverse the same with the rear end threaded to cooperate with a threaded rod 58 to be manually operated at will and to thereby raise or lower the chin-rest as may be needed in the particular instance.

It will be noted that the projection of the image or jewel 35 on each target 34 is seen in the mirror by reflected light as the source of illumination 36 is between the mirror and target. If desired, the image may be viewed by transmitted light, for which purpose the covers 7 may each be formed with a slot 59 between the source of illumination 36 and the proximate mirror, the upper surface of the partition 2 in line with the slot being formed with a guideway 60 to receive and support frames 61 carrying transluscent sheets 62 upon which any desired characters may be printed or otherwise affixed to vary the type of the visual reflection, as may be desired to avoid monotony to the patient or for special test purposes. The targets 34 are driven by a shaft 63 extending longitudinally in suitable bearings on the bottom of the partition 2, each end of the shaft 63 being provided with a gear 64 one directly and one indirectly engaging and operating the targets in synchronism. The shaft 63 is operated by an electric motor 65, the circuit of which is controlled by a switch 66 and the motor shaft is formed or provided with a worm 67 engaging a worm gear 68 on an auxiliary shaft 69 which extends parallel to the shaft 63 in one direction from the motor and is terminally provided with a belt wheel 70 connected by a belt 71 with a belt wheel 72 on the adjacent shaft 68.

A belt tightener in the shape of a wheel 73 bearing on the belt and controlled through a hand lever 74 capable through means indicated at 75 of being locked in various positions of adjustment insures proper predetermined speed of the targets. The end of the auxiliary shaft 69 opposite the belt wheel 70 is connected through gearing 76 with an appropriate governor 77. If desired and as preferred, the speed of the motor may be controlled through an adjustable resistance switch 78.

With the parts arranged and correlated as described and assuming the use of the targets for the test and training, the motor or clock-work 19 is energized or wound causing the pointer 45 to move over the scale 46 to the limit in one direction or the other from the zero point of such scale to the limit determined by the set of the eccentric 26. It is obvious that when the pointer has reached this limit, it will immediately return over the scale to the zero point. Of course, as the pointer is operated in and by the movement of the shaft 15 and as the shaft is moved by the eccentric through the movement of one of the mirrors, as 17, and through the similar connection from the eccentric to both mirrors 17 and 18, the actual operation of the eccentric causes the mirrors to swing in a horizontal plane from the shaft 15 as a center synchronously in opposite directions. That is to say, the mirrors move their free ends alternately toward and from each other to thus vary the prism power to which the vision is subjected, the extent of this prism power being indicated by the movement of the pointer 45 over the scale 46.

The patient, with his chin resting in the appropriately adjusted chin-rest 55 and his eyes close to and viewing the interior of the case through the lenses 54, sees the targets and particularly the jewels 35 thereon under binocular vision as a single image. If the two eyes are coordinating properly, the single image is maintained during the movement of the pointer throughout the set limit of travel, whereupon the operator will adjust the clock-work bodily through the manipulation of the rod 20 to thereby spaced the free ends of the mirrors farther apart at their point of closest approach than in the original setting. That is to say, in the swing of the mirrors under the action of the eccentric in the initial setting, their free ends are spaced a definite distance apart when the pointer is at the zero position of the scale and by adjustment of the clock-work or motor toward or from the mirrors, this normal spread or spacing of the free ends of the mirrors may be reduced or increased according to the direction of adjustment of the clock-work.

As the pointer travels in the same direction as the movement of the mirrors under the eccentric, it will be apparent that when the clock-work is adjusted bodily toward the mirrors, their initial spacing will be increased and thus as the mirrors move in response to the eccentric movement, the pointer will travel to the right of the zero point, as viewed from the front of the case, over the scale, whereas if the clock-work is adjusted to decrease the initial spacing between the free ends of the mirrors, the pointer will travel to the left of the zero point, as viewed from the front of the case.

If, during the test, it is found that the vision of the patient beholds the views of the targets as a single image, the clock-work is adjusted to cause the pointer to swing over the scale in the same direction in which it has been moving but to a greater extent. Of course, the eccentric compels identical movement of the pointer in any one setting of the clock-work, so that in the new setting of the clock-work, the pointer swings over the same area of the scale as in the initial setting, but as the clock-work has been adjusted to increase the reach of the pointer on the scale, the pointer in its return from its maximum scale position to the minimum will not, of course, reach the zero position. In other words, if the initial swing of the pointer is from zero to 10 and the clock-work has been adjusted to cause the pointer in its maximum position to reach 15, the pointer in its return will have its minimum position at 5.

During the test of the particular patient, the adjustment of the clock-work is continued to increase the maximum swing of the pointer until the patient advises that the image at or approaching the maximum swing of the pointer is seen as two images. This is a condition of diplopia and indicates that the eyes are not coordinating to hold binocular vision but that one or the other of the eyes are at the point of prism power indicated at the break of the single image into two images turning in or out. It is for the purpose of correcting this lack of coordination that the present instrument is devised, for it is a well known fact that under a proper training exercise a reallotment of innervation to the eye muscles by the brain may be brought about to widen the coordinated relationship between the accommodative and adductive functions of the eyes and thus create an incentive to binocular vision beyond the possible range of such vision before treatment.

It is, of course, to be remembered that the mirrors are continually moving to vary the prism power from the minimum to the maximum as indicated by the range of the pointer and as the clockwork has been adjusted to carry the prism power to a point slightly beyond a condition of diplopia in the particular patient, it will, of course, be apparent that as the mirrors move to their position of minimum prism power in the particular adjustment, the eyes will have the greater portion of this range for binocular vision. Thus, the mirrors, or more particularly the prism power, are continuously reciprocated from a minimum to a maximum at which or approaching such maximum a condition of double vision is apparent.

The treatment over this range is continued and incident to the inherent tendency on the part of the patient to maintain binocular vision, it will be found that gradually the patient can maintain binocular vision up to the point of the maximum prism power of the mirrors in their then setting. When this condition is reached, a course probably covering several treatments, the swing of the mirrors is increased, that is the prism power is increased, again carrying the vision at the maximum range of prism power to a point of diplopia. The treatment is continued through this range until gradually the patient maintains binocular vision throughout the range. Through a series of treatments, therefore, coupled with the incentive to binocular vision in the patient, the coordinated relation or lock between the accommodative or adductive functions of the eyes is increased until a natural normal condition is reached.

The treatment of the eyes to accomplish this result by variation in prism power has been recognized but the carrying out of the treatment has been to increase the prism power to a point of diplopia and maintain this condition during the treatment. Naturally this character of treatment results in a very serious strain on the muscles of the eyes and the nerves controlling the muscles, with the effect that the patient is seriously inconvenienced thereby. In many instances, the strain results in severe head pains and at times more or less bodily derangements which are highly objectionable. This heretofore unsurmountable difficulty has compelled comparatively short treatments and thus a very extended series of treatments to reach the desired result. It is a particular and important function of the present instrument to overcome this difficulty and to avoid any serious after-effects on the patient, permit longer single treatments without after-effects, and thus very materially shorten the time of complete treatment in a particular instance. This is gained through the fact that when the prism power has been carried to the point of diplopia of vision, it is maintained at this point only during the period of movement of the mirrors, increasing the prism power to a point to produce this effect, and the prism power is immediately reduced and will remain during the swing of the mirrors and pointer from the maximum to the minimum and from the minimum toward the maximum in a position permitting binocular vision. As during this period of binocular vision, the eyes are under no strain other than a normal one and remain under strain only during the periods of maximum power, which are of course very short due to the substantially constant movement of the mirrors, the eyes are under strain but momentarily and during the remainder of the periods are at rest or under no strain other than the normal one. Thus, in the particular instrument, there are momentary periods of strain and longer periods of rest, alternately and constantly repeated. Therefore, while the effect of the strain periods is exactly the same as under the constant prism power change heretofore practiced, there are periods of rest between each period of strain which so changes the effect on the eye muscles and nerves supplying them as to materially reduce if not completely eliminate the after-effects of the treatment.

Thus, the alternate periods of strain and rest to which the eyes are subjected during the treatment by this instrument constitute a very material advance in this art, for thereby the after-effects of the continued eye strain incident to the previously practiced methods is substantially eliminated, permitting the particular period of treatment to be maintained for a greater length of time than heretofore possible and thereby reducing the number of treatments necessary to reach the desired result. Of course, by mirror adjustment as described, the correction of co-ordination may be provided where the eye or eyes turn in or out, the same operative functions being carried out in each instance.

If at the point of diplopia, it has been found that the two images are not aligned horizontally when viewed through the lenses, an indication is thus presented that the eyes are out of vertical balance and the pointer 49 is manually adjusted to raise one mirror and correspondingly lower the other mirror until the two images are substantially in the same horizontal plane. This condition, from lack of vertical balance, is simultaneously corrected by the use of the instrument as is the horizontal balance as above referred to.

The important detail of the present invention is in the provision of subjecting the eyes to alternate periods of strain and rest automatically with each period of rest and period of strain constantly and uniformly repeated, with the effect of eventually coordinating the visual control of a pair of eyes by compelling a reallotment of innervation to the eye muscles by the brain, with the additional function of adjusting the degree of strain as the lack of comfortable coordination is gradually corrected.

If, during the test, the vision of one eye is found to be stronger than the other, they may be brought to substantially equal vision effect by the control of the degree of illumination of the respective bulbs 36 through government of the particular resistances 39 in a well understood manner.

With the above instrument any character of targets or test devices may be used, provision being made particularly herein for the use of revolving targets or fixed test devices, as indicated at 62. The character of the test devices depends, of course, upon the nature of the treatment. The character of the control of the drive may be conventional, the clock-work may be substituted by a motor providing for proper movement of the mirrors and permitting necessary adjustment thereof, and any conventional means may be provided to control the degree of illumination.

Figures 1, 10, 11, 12, 13:
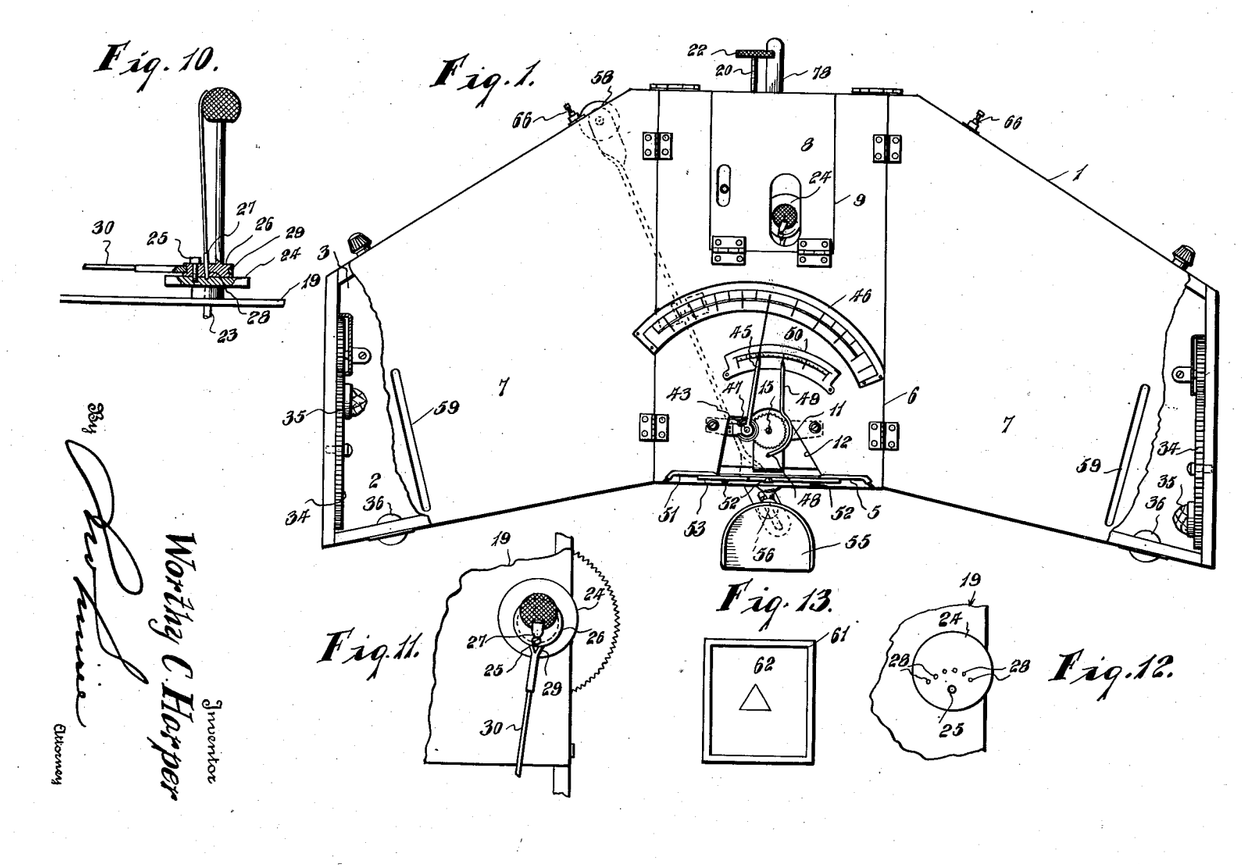
Figure 1 is a plan view of the instrument, partly broken out.
Figure 10 is a detail view, partly in section, showing the eccentric mounting for operating the mirrors.
Figure 11 is a plan of the same.
Figure 12 is a plan of the disk showing the adjustment openings for the eccentric.
Figure 13 is a face view of a modified target for use with the apparatus.
Figures 2, 6:
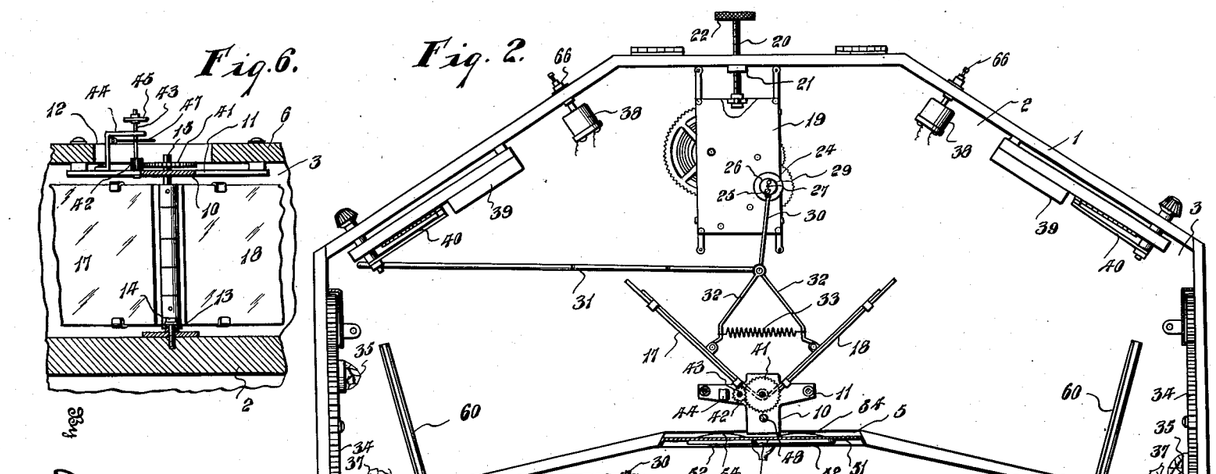
Figure 2 is a plan view of the instrument with the cover removed.
Figure 6 is a front view of the same.
Figures 3, 7, 8, 9:
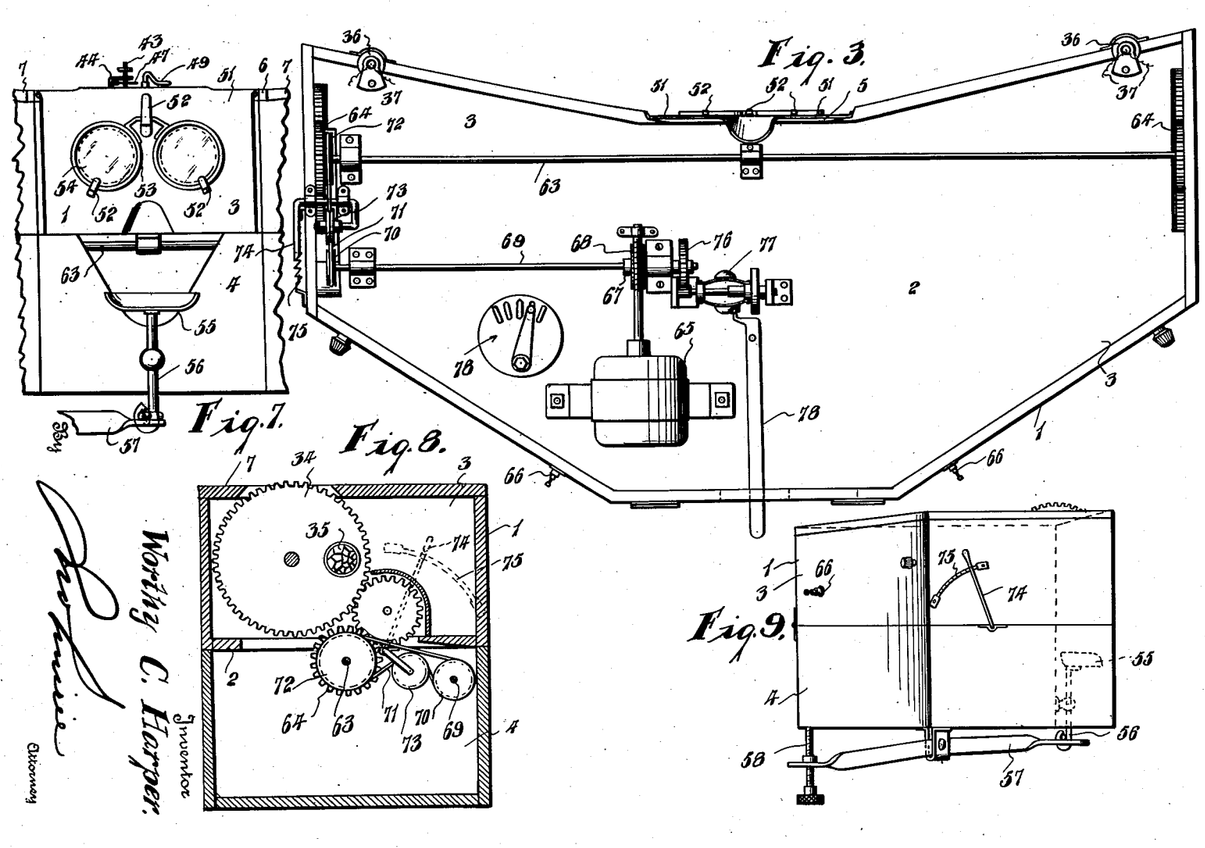
Figure 3 is a bottom plan view of the upper section of the case, showing the driving means.
Figure 7 is a broken front view of the case, showing particularly the sight openings and chin-rest.
Figure 8 is a view in elevation, partly in section, showing the driving means for the rotating targets.
Figure 9 is a side view showing the means for adjusting the chin-rest.
Figure 4:
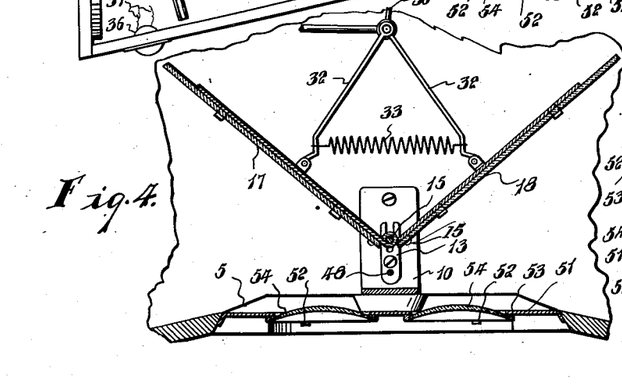
Figure 4 is a broken plan showing the mounting and connection of the mirrors.
Figure 5:
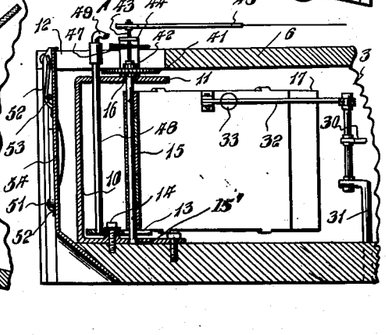
Figure 5 is a side view of the same.
Figures 14, 15:
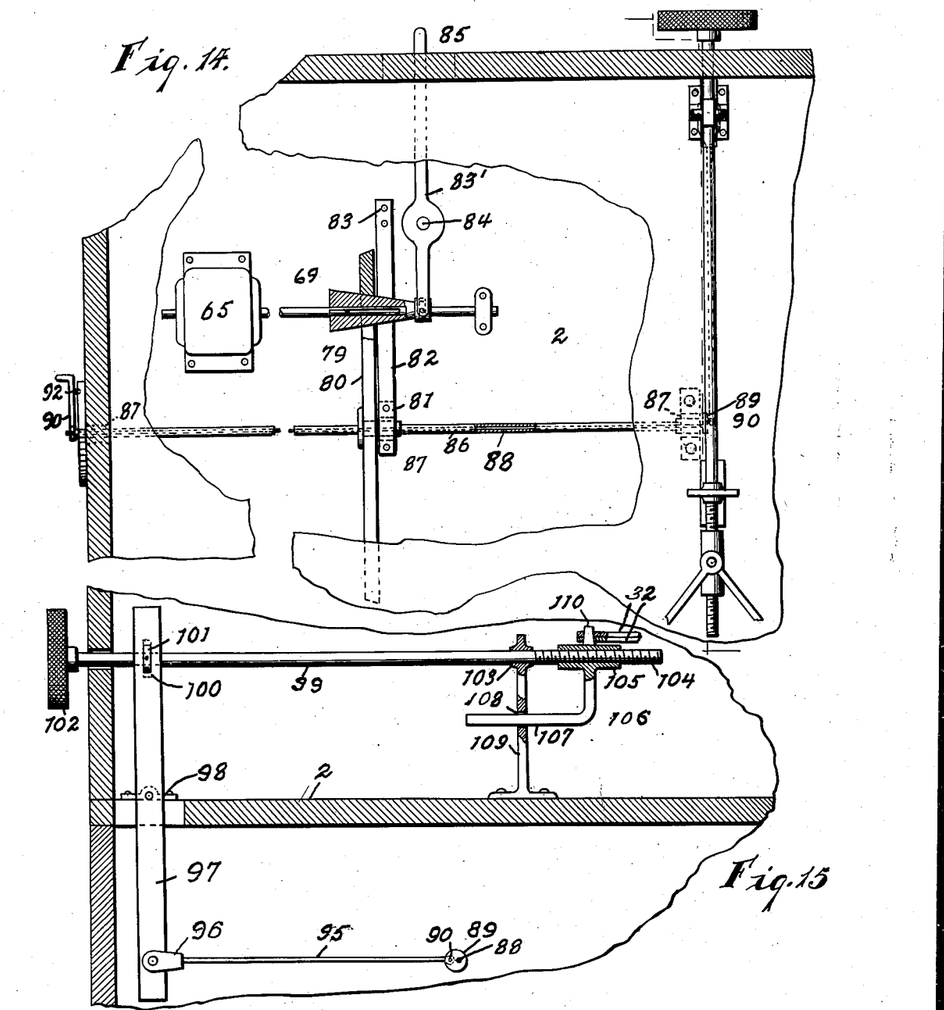
Figure 14 is a broken plan of a modified form of mirror operating mechanism.
Figure 15 is a side elevation of the same.
Figure 16:
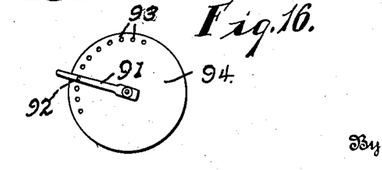
Figure 16 is a face view of the means for manually adjusting the mirror operation.

As an alternative means for operating the mirrors to permit the use of a single driving motor for the entire apparatus, the construction used in Figures 14, 15 and 16 is provided. The shaft 69 is provided with a cone 79 rotatable with the shaft but axially adjustable thereon. The cone has frictional driving engagement with a disk 80, the bearing 81 of which is supported in a spring strip 82 fixed at 83 to the under side of the partition 2. The cone 79 is adjusted through a finger lever 83' pivoted at 84 and terminally engaging a collar rotatable on the cone, one end of the lever projecting beyond the side wall of the case, as at 85, for convenient manipulation. The cone may thus be adjusted longitudinally of the shaft 69 to drive the disk 80 at selected speeds, the disk yielding under cone adjustment through the spring support 82 to insure the driving frictional contact. A hollow shaft 86 is secured to and passes through the disk 80, this shaft having eccentric bearings at each end, as at 87. The shaft 86 is hollow and a drive rod 88 extends therethrough and is operated thereby. The end of the drive rod has a disk 89 with an offset outstanding pin 90, to provide a crank movement in the operation of the disk 89. The shaft 86 extends beyond one side wall of the casing and is provided with a finger lever 91 by which the shaft may be turned. This lever is of spring type and has a pin 92 adapted to seat in any one of the series of openings 93 in a plate 94 secured to the outer side of the wall of the hollow shaft. By this means the shaft may be turned in its successive bearings to vary the throw of the crank 90, the mountings being such that it is possible to dispose the crank pin 90 in the center of rotation of the shaft and thus interrupt any crank movement.

The crank pin 90 is connected by a rod 95 which has yoke connection at 96 with a lever 97, extending through the partition 2 and swingingly connected to said partition at 98. The upper end of the lever 97 is formed with an opening for the passage of a shaft 99 and is slotted at 100 to receive a ring 101 which is secured to the shaft 99. This construction permits the shaft 99 to rotate freely in and with respect to the lever 97 while at the same time insuring that the movement of the lever will correspondingly reciprocate the shaft 99. One end of the shaft extends beyond the side wall of the case and is provided with a finger disk 102, whereby the shaft may be rotated at will. The opposite end of the shaft extends freely through a bearing 103 and beyond the bearing is threaded at 104 to cooperate with a sleeve 105 mounted on the threaded portion and obviously movable toward and from the bearing 103 in accordance with the direction and to the extent that the shaft 99 may be rotated through the finger disk 102. The sleeve 105 has a rigid depending brace 106 which at the lower end is extended laterally, as at 107, and is accurately guided through an opening 108 formed in the upright 109 which supports the bearing 103. The sleeve 105 is provided with an upstanding pin 110 to which the mirror operating arms 32 of the construction previously described are connected. Beyond this point, the construction is as previously described.

According to the cone adjustment for speed, the shaft adjustment for crank throw and the operative adjustment of shaft 99, it will be apparent that the speed of movement and the maximum and minimum divergence of the mirrors may be readily controlled exactly as through the clock-work motor 19 of the previous form.

Figure 18:
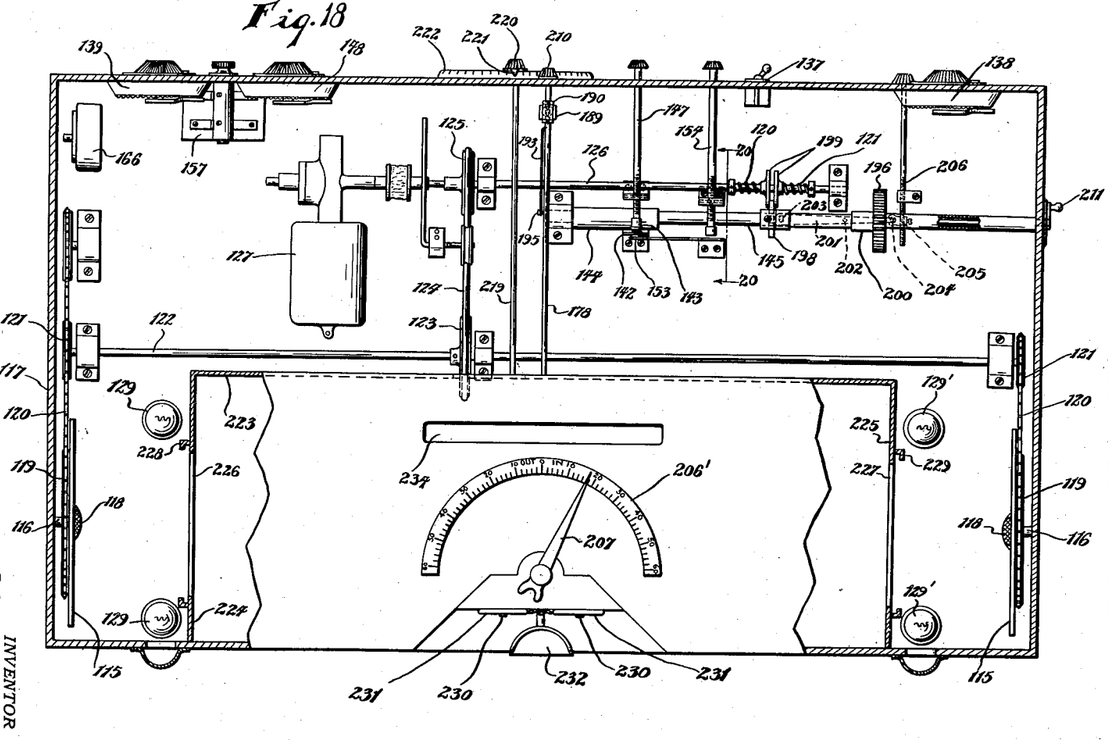
Figure 18 is a plan view of the instrument shown in Figure 17 having the greater portion of the top thereof removed to show the details of construction.
Figure 19:
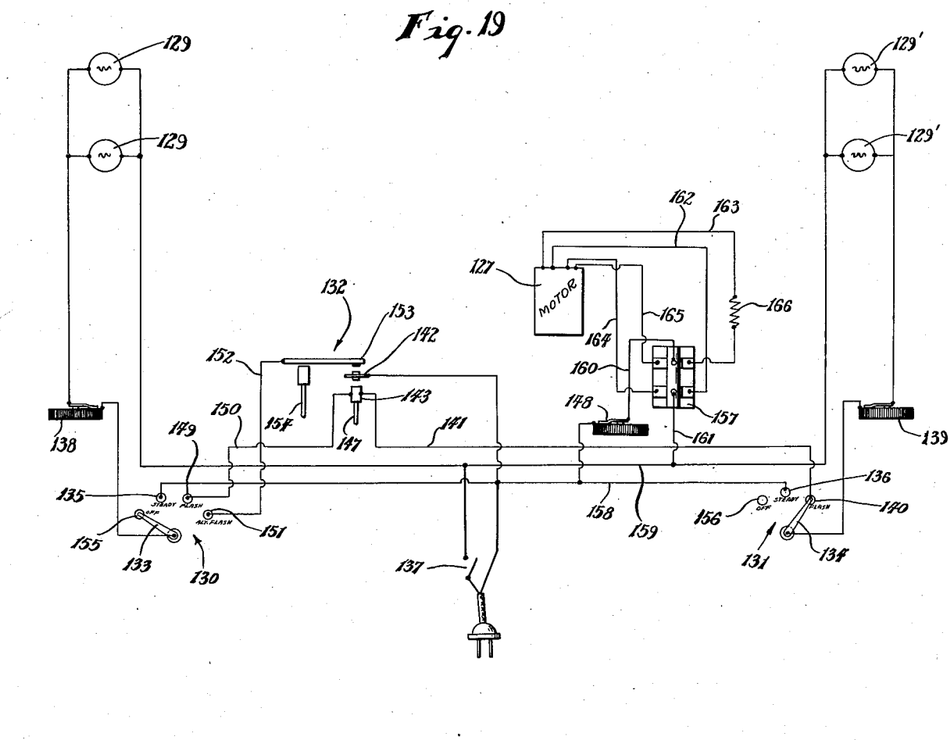
Figure 19 is a schematic view of the flasher and motor control system.
Figure 20:
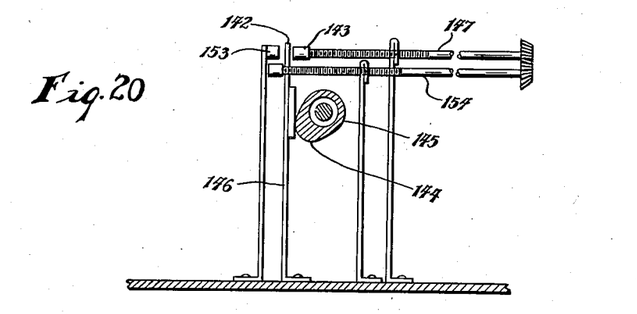
Figure 20 is an enlarged fragmentary sectional view taken on line 20—20 of Figure 18.

In Figures 18 to 20 inclusive, there is shown a further modified construction having targets 115 rotatably supported at 116 within the instrument housing 117. The targets 115 are each provided with image producing means, such as a brilliant or jewel 118, having a plurality of facets disposed at different angular relations to each other. The targets 115 are rotated about their pivots 116 by means of sprockets 119 connected by chain members 120 to sprockets 121 secured adjacent the opposite ends of the shaft 122. The shaft is in turn rotated by means of a pulley 123 driven by a belt 124 connected with a pulley 125 to a shaft 126 driven by a motor 127.

The targets 115 are rotated in opposite directions so that when the images of the brilliants 118 are reflected by the mirrors 128 they will appear as being both rotated in the same direction. The targets 115 are illuminated by spaced electrical lamps or bulbs 129 and 129'. The said lamps may be continuously illuminated or synchronously or alternately flashed by means of an electric system, such as shown in Figure 19, having incorporated therein positive manually controlled switch means 130 and 131 and automatically operating make and break means 132.

It will be noted that when the blade 133 of the switch member 130 and the blade 134 of the switch member 131 are in engagement with the contacts 135 and 136 respectively, the sources of illumination 129 and 129' will be continuously illuminated, particularly when the main switch member 137 to the source of electrical energy is closed. The intensity of the sources of illumination may be separately controlled or varied by means of suitable rheostats or the like 138 and 139.

Should it be desirable to have the source of illumination 129' flash while the source of illumination 129 is continuous, the blade 134 is engaged with the contact 140 of the switch 131. This causes the electrical energy feeding the source of illumination 129' to flow through the circuit 141. The flashing is brought about by the successive engagement of the contact member 142 with the contact 143. By reference to Figure 20, it will be seen that a rotating cam member 144 carried by the shaft 145 intermittently causes the contact 142 to move into and out of engagement with the contact 143 through the resilient action of the support 146 of said contact 142. The period of illumination is controlled by the duration of the engagement or disengagement of the contacts 142 and 143. This is controlled by the adjustment of the screw support 147 by means of which the contact 143 may be moved toward or away from the contact 142. This may also be controlled by varying the speed of rotation of the shaft 145. This is brought about by reducing or increasing the speed of the drive motor 127 through the rheostat 148.

Should it be desirable to have the source of illumination 129 synchronously flashed with the source of illumination 129', the blade 133 of the switch 130 is moved into engagement with the contact 149. It will be seen that this contact 149 is connected through the line 150 with the contact 143 so that the circuits controlling the illumination of both sources of illumination 129 and 129' are opened and closed simultaneously through the engagement and disengagement of the contacts 142 and 143.

Should it be desirable to have the sources of illumination 129 and 129' alternately flash, the blade 133 of the switch 130 is moved into engagement with the contact 151. This contact 151 is connected through the line 152 to a variable contact member 153. By again referring to Figure 20, it will be noted that the contact member 153 is placed on the side of the contact 142 opposite the contact 143, so that when the cam member 144 is rotated, the contact 142 is moved from engagement with the contact 143 into engagement with the contact 153. This causes the circuit 141 to be deenergized, thereby shutting off the source of illumination 129', and the circuit 152 to be energized to illuminate the source of illumination 129. The duration of the period of illumination of the source of illumination 129 is controlled by the screw member 154 which may be adjusted to move the contact 153 to varying spaced relation with the contact 142. This causes the contacts 153 and 142 to remain in contact with each other in variable periods of duration. It will be noted, therefore, that as the cam 144 rotates, the sources of illumination 129 and 129' will be alternately and successively illuminated. As previously stated above, the intensity of the sources of illumination 129 and 129' is separately controlled by rheostats 138 and 139. This is true in all instances.

When it is desired to disconnect one or the other of said sources of illumination, the blades 133 and 134 are moved into engagement with the contacts 155 and 156.

The motor 127 is of the reversible type, being connected through a reversible switch 157 to the main feed lines 158 and 159 by means of the lead wires 160 and 161. Suitable lead wires 162 and 163 are connected to the motor circuit for rotating the motor in one direction and lead wires 164 and 165 are connected to the motor circuit for rotating the motor in the opposite or reversed direction. In order to control the speed of rotation or balance the speed of rotation of the motor in both directions, a suitable resistance unit 166 is placed in the circuit 163. This resistance unit is used to reduce the current flow to the motor when the said motor is rotating in its normal direction so as to cause the speed of rotation of the motor when reversed to be equivalent or substantially equivalent to its speed in normal direction of movement. This is due to the fact that when the direction of movement of a motor is reversed, the speed is automatically cut down, so in order to balance the speed of rotation, the initial normal movement of the motor is reduced through the resistance unit 166. The speed of the motor in either direction may thereafter be controlled through the rheostat 148. The reverse action of the motor is brought about by shifting the contacts of the feed lines 160 and 161 from engagement with the contacts connected with the lead wires 162 and 163 to the contacts connected with the lead wires 164 and 165 and vice versa.

The mirrors 128 are hingedly supported on a bar member 167 so that they may be swung toward and away from each other in a horizontal plane. The said bar member 167 is pivotally attached at 168 to a bracket 169, see Figure 21, carried by the base of the instrument. This is to enable the mirrors 128 to be swung or tilted in a vertical plane. The movement in the horizontal plane is brought about through link members 170 pivotally connected at 171 adjacent one end thereof to the mirrors 128 and at 172 adjacent the opposite end thereof to a bracket 173. The bracket 173 is pivoted at 174 to a member 175 having a portion 176 slidable within a bearing 177 carried by the bracket 169. The portion 176 of the member 175 is moved longitudinally of the bearing 177 by a rod 178 see Figure 17, threadedly connected at 179 to the member 175.

Figure 17:
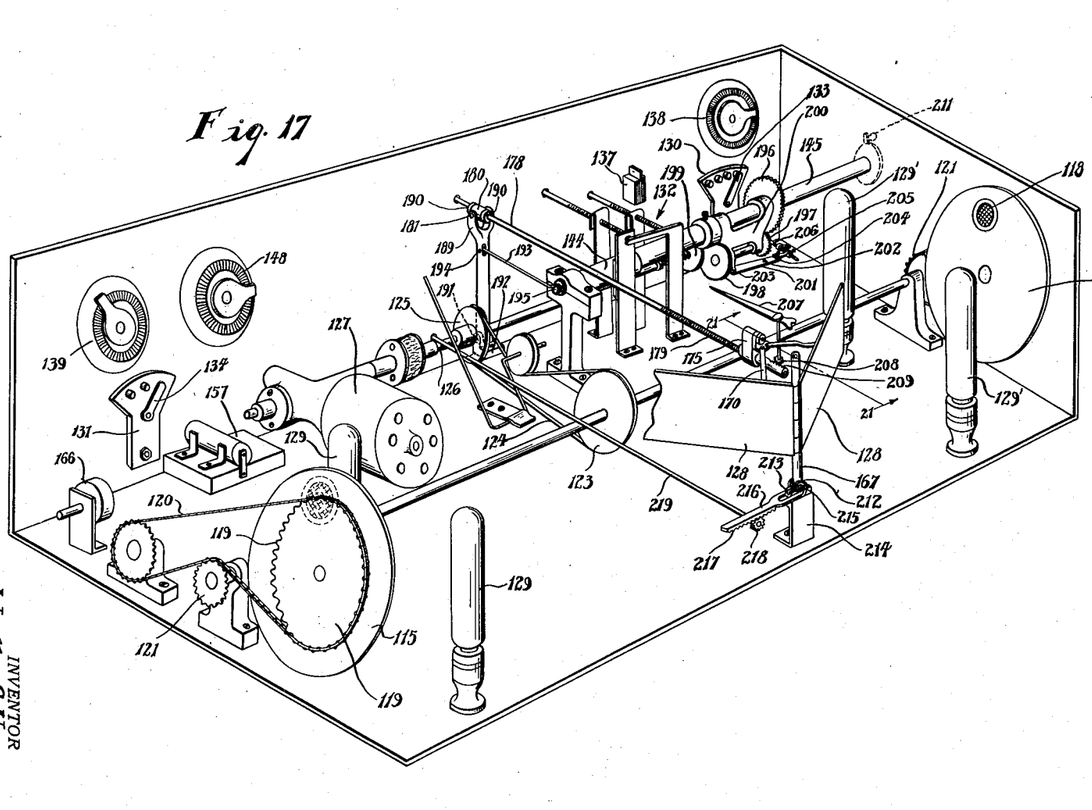
Figure 17 is a perspective view of a modified form of instrument having incorporated therein a flash system and other modified details of construction.

The rod 178 is rotatably supported in a sleeve 180, which in turn is pivoted at 181 to a yoke 189, see Fig. 17. The sleeve 180 is held against movement longitudinally of the rod 178 by suitable collars 190 secured to the rod by set screws, pins or the like. The yoke is pivotally connected at 191 to a bracket 192 secured to the base of the instrument. The yoke has a link member 193 attached thereto intermediate its ends as indicated at 194. The link member 193 is attached adjacent its opposite end to a eccentric crank member 195. The crank, as shown in Figures 17 and 18, is secured to the end of the shaft 145 and is adapted to be operated by the rotation of the shaft 145. The crank member 195 is so constructed that its throw is variable, that is, its operation is similar to that of the member 89, shown in Figure 14, and which has been previously described in detail.

The shaft 145 is rotated by means of a gear 196 which meshes with a gear 197, which is in turn driven by a disk 198 which fits in between two friction disk members 199, which are keyed to the main drive shaft 126. The disks 199 are forced into frictional engagement with the disk 198 by means of the springs 120 and 121 respectively. The gear 197 and the disk 198 are carried by a bracket 200 which is mounted to swing on the shaft 145. The object of this arrangement is to provide means whereby the disk 198 may be moved toward or away from the shaft 126 to increase or decrease the speed of rotation of the gear 197. The bracket is swung toward or away from the shaft 126 by means of a link member 201 pivotally connected at 202 to the base of the machine and having a pivotal connection at 203 with a projection on the bracket adjacent one end thereof and with a combination slide and pivotal connection 204 of a screw adjusted member 205 adjacent the opposite end thereof.

The member 205 is threadedly connected with a threaded bar member 206 and is adapted to move longitudinally of said bar member 206 when it is rotated. This causes the link member 201 to be swung about its pivot 202 and in turn swing the bracket 200 on the shaft 145. This arrangement increases and decreases the speed of rotation of the crank member 195 so that the extent of the oscillation of the mirrors 128 in the horizontal plane may be controlled.

Figure 21:
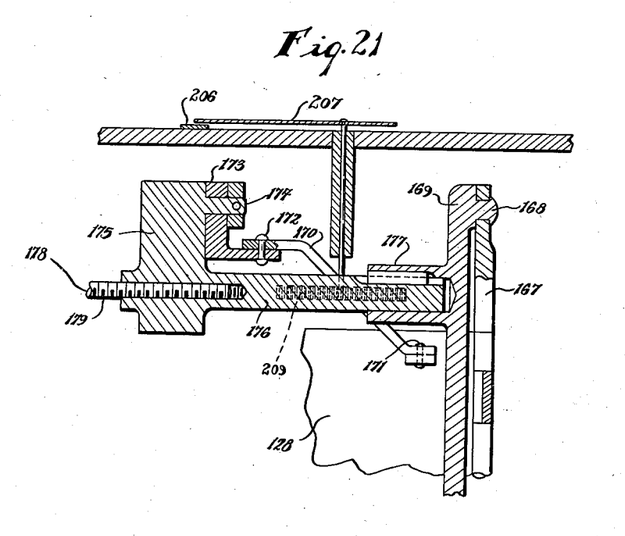
Figure 21 is an enlarged fragmentary sectional view taken as on line 21—21 of Figure 17 and showing the bearing means and pivot support for the mirrors and mirror operating means.

The amount of oscillation of the mirrors 128 is determined by means of a scale 206', see Figure 18, and indicator 207. The indicator 207, as shown in Figures 17 and 21, is operated by means of a gear 208 which meshes with a rack 209 formed on the side of the slide 176. When the slide 176 is reciprocated back and forth through the action of the crank member 195 to oscillate the mirrors 128, the gear 208 is simultaneously rotated and causes the indicator 207 to move a predetermined amount over the scale 206', the scale 206' being so graduated as to indicate the extent of said oscillation in terms of prism diopters.

To initially introduce the amount of prism power desired before the eyes of the patient prior to the oscillation of the mirrors or to vary the amount of prism power before the eyes of the patient during the oscillation of said mirrors, the rod 178 is rotated by means of the thumb nut 210. This causes the threaded portion 179 to be threaded into and out of the member 175 and thereby increases or decreases the angle between the mirrors 128. The amount of adjustment will be recorded by the scale and indicator means 206' and 207. This arrangement, therefore, provides means whereby the amount of effective prism power desired before the eyes may be introduced, either base-in or base-out, by adjustment of the screw member 179. The extent of oscillation to further increase or decrease the effective prism power as desired is introduced through the adjustment of the swing of the crank member 195. This crank member may be adjusted to the dead center of the shaft 147 so that there will be no oscillation of the mirrors, or it may be adjusted to its extreme throw to introduce a considerable oscillatory movement to said mirrors. This adjustment is accomplished by means of the manually operable handle member 211.

The bar member 167 supporting the mirrors 128 is swung about its pivot connection 168 to the bracket 169 by movement of its lower end 212 longitudinally of a groove 213 formed in a base support 214. The lower end 212 is pivotally connected at 215 to a slide bar 216 having a rack portion 217 meshing with a pinion 218. The pinion 218 is mounted on a rod 219 which is adapted to be manually operated by a thumb nut 220, see Figures 17, 18 and 21. The thumb nut 220 is provided with an indicator 221 which moves over a curved scale 222. When the thumb nut 220 is rotated to the left or to the right, the mirrors 128 are tilted in a vertical plane about the pivot 168. The bracket 173 is simultaneously tilted about the pivot 174 which is in axial alignment with the pivot 168. The amount of movement is determined by the position of the indicator 221 relative to the scale 222. The scale 222 is preferably graduated in prism diopters.

The mirrors 128 are preferably supported within a chamber formed by a back wall 223 and side walls 224 and 225 so as to conceal the working mechanism of the instrument from view during use. The side walls 224 and 225 are provided with open areas 226 and 227 through which the rotating targets 115 are viewed. The side walls are also provided with vertical slideways 228 and 229 for supporting auxiliary test charts or targets in alignment with the openings 226 and 227.

The housing 117 of the instrument is provided with sight openings in the front thereof through which the reflected images of the test target are viewed. Suitable clip means 230 are provided adjacent said sight openings for supporting corrective lenses or other suitable means 231 in alignment with the said openings, see Figure 18. A suitable adjustment chin rest 232 is also provided for supporting the head of the patient in alignment with said sight openings. The corrective lenses 231 are supported in suitable holders by means of which they may be interchanged, if desired.

During the use of the instrument the patient's head is supported with his eyes aligned with the sight openings of the instrument. He is adapted to view the images of the rotating fixation means 118 in the mirrors 128. The said mirrors are adapted to be adjusted under normal conditions of use until the patient reports comfortable single binocular vision of the images. The machine is then set into operation. The swing or oscillation of the mirrors as controlled by the crank 195 and other associated mechanism is then adjusted to control the extent of the oscillation of the mirrors. The amount of effective prism power, either base-in or base-out, is then introduced by rotation of the rod 178 by turning the thumb nut 210. This varies the angle between the mirrors and also produces an effect similar to that of placing prism lenses, either base-in or base-out, before the eyes depending upon the adjusted positions of the mirrors. The oscillation of the mirrors produces an effective prism power which is continually increased and decreased within a selected range depending of course upon the amount of oscillation of the mirrors.

It is to be understood that the above is merely an outline of the general function of the instrument.

The instrument provides means whereby several treatments, tests and measurements may be accomplished. Some of the treatments are as follows:

Convergence and divergence treatments, version treatments, retinal stimulation treatments, stereoscopic treatments, vertical and horizontal treatments, accommodative treatments, phoria tests, tropia measurements, either vertical or horizontal, disassociation technique, and duction measurements, etc.

The above treatments, etc., are set forth with a view to distinguishing some of the accomplishments of the instrument. It is to be understood that the above treatments, etc., may be accomplished separately or simultaneously.

The convergence and divergence treatments are carried out substantially as follows: It is to be assumed that the patient is suitably positioned before the instrument. The sources of illumination 129 and 129' are turned on. Suitable targets are then exposed to the patient. These targets are preferably supported in the slide supports 228 and 229 in alignment with the openings 226 and 227 in the side walls of the mirror housing. Suitable lenses 231 for accommodative control are placed before the eyes. The mirrors 128 are then adjusted by turning the thumb nut 210 to vary the angle therebetween in the horizontal plane and/or by turning the thumb nut 220 to vary the angle in the vertical plane until the patient reports easy fusion of the targets. The instrument is then set into operation at desirable speed as controlled by the rheostat 148.

If desired the mirrors 128 may be oscillated by the rotating crank member 195 and associated mechanism to produce an increasing and decreasing effective prism power before the eyes. The amount of effective prism displacement is controlled by operating the hand lever 211 which varies the throw of the crank 195. The above treatment may be performed either with stationary targets or with targets having eccentrically rotating fixation means thereon.

The amount of effective prism power may, if desired, be increased or decreased either through the plus or minus range during the oscillation of the mirrors by rotation of the thumb nut 210 which either increases or decreases the angle between the mirrors separately of the oscillation function thereof.

In addition to the above, the speed of operation of the instrument may be varied.

It is also possible during any of the above arrangements to introduce vertical compensations by manually rotating the thumb nut 220 back and forth predetermined amounts. This gives vertical duction exercises.

The above exercises may be given first with the targets rotating in one direction and with the targets set to rotate in a reverse direction to change the order or pattern of coordination response. This is brought about by reversing the switch member 157.

It is also possible to ontroduce break and recovery treatments with any of the above arrangements. This is brought about by flashing the illumination, or may be brought about by adjustment of the effective prism power before the eyes so that it is possible for the patient at one point of oscillation of the mirrors to fuse the images, and at another point of oscillation it will be impossible for the patient to obtain fusion. This latter arrangement is brought about by adjusting the angle between the mirrors by rotation of the thumb nut 210 to such a position that there will be an automatic change between the break and recovery points.

The flashing of the sources of illumination may be synchronous and so timed that it will occur at the instances when the greatest amount of prism power, either base-out or base-in, is before the eyes, or at the instance when the least amount of prism power, either base-out or base-in, is before the eyes or at any intermediate point.

It is also possible and desirable in some instances to have the flash sustained throughout the range of either the increasing or decreasing of the effective prism power, or it may be momentary at the points of maximum or minimum prism power.

It is also possible and desirable in some instances to vary the power of the lenses 231 before the eyes to control accommodations during the above treatments.

The version treatment is introduced by using rotating targets having ecechtric fixation means thereon or with targets having the fixation means exposed at varying points or with varying degrees of displacement of fixation points during the rotation thereof and having the mirrors fixed at the position of easy fusion of the targets or fixation means.

Retinal stimulations for amblyopic treatment are introduced monocularly by the selection of suitable targets as to degree of size, shape or color depending upon the degree of amblyopia, occluding the good eye and setting the flashing system so that the source of illumination for the target will be successively flashed. In this instance, the targets are of the fixed type.

The above treatment may be performed by the use of movable targets with different points of fixation. In this particular instance, there is no flashing of the source of illumination.

The above may also be performed with the use of movable targets combined with the flashing.

The intensity of illumination in any one of the above cases should be sufficient for the patient to view the target, the intensity of illumination being controlled by either the rheostat 138 or 139, as the case may be.

Retinal stimulations may also be introduced with binocular vision. In this instance, suitable targets are selected for each eye. The mirrors 128 are adjusted to compensate for angle of squint and to obtain point of easy fusion. The flashing system for the sources of illumination may be either set for synchronous or alternating flashing, as has been previously described. In this particular instance, the targets are of the fixed type.

The above treatment may also be performed with rotating targets with fixed illumination.

Stereoscopic treatments may be performed by the selection of proper stationary stereoscopic or pseudoscopic targets, the convergence or divergences being controlled by adjustment of the angle of the mirrors 128. With the above arrangement, targets can be rotated to change the degree of stereoscopic or pseudoscopic effect. The accommodation may also be controlled by the proper selection of lenses 231. The illumination may also be controlled as previously described above.

Accommodative treatments are introduced by the use of suitable targets for accommodation control and by the use of proper compensation lenses 231. The above treatment may be performed with convergence or divergence and with illumination flashing.

Phoria tests are performed by the selection of proper fixed targets. In the instance of horizontal phoria, the accommodation is first controlled by the selection of proper accommodation lenses 231, and vertical disassociation is compensated for by adjustment of the thumb nut 220. The images are then moved into alignment horizontally by adjustment of the angle of the mirrors through rotation of the thumb nut 210 and the amount of adjustment to bring about this result is determined by taking readings from the scale and indicator means 206' and 207 to obtain the horizontal measurement.

The vertical phoria is obtained by first disassociating the images of the fixed targets horizontally and by tilting the mirrors 128 through adjustment of the thumb nut 220 to tilt the mirrors vertically until the patient reports the images as being in alignment. The readings are taken from the scale and indicator means 221 and 222 to obtain the vertical measurement.

Tropia measurements are obtained by producing alternate fixations through the use of the flashing system. The mirrors are adjusted horizontally and vertically until all eye movements stop. The patient's eye movements are preferably watched during the adjustments of the mirrors so as to be assured that the point of alignment of the images has been reached and that the eye movements have stopped. When this has been accomplished, the approximate angle of deviation is determined by reading the scale and indicator means 206' and 207 for the horizontal, and 221 and 222 for the vertical. You then inquire as to whether or not the patient sees both images in the same place. The procedure from then on is continued in the manner decided upon by the examiner. This is due to the fact that there are no fixed rules for the further procedure.

Disassociation technique is as follows: If the patient is amblyopic, (suppresses vision with one eye) an attempt is made to overcome suppression by moving the image viewed by the suppressing eye outside of the suppression area. The sources of illumination are then set to flash alternately or simultaneously until the patient reports vision in both eyes, or has definitely established simultaneous binocular vision. The prism power is then decreased horizontally or vertically to decrease the suppression area with a view to obtaining normal single binocular vision.

Duction measurements are obtained by adjusting mirrors, horizontally or vertically, until the patient obtains single binocular vision. The fusional amplitude in the horizontal meridian is determined by adjusting the mirrors horizontally to the innermost angle at which fusion can be maintained, or until the breaking point is reached, and by adjusting the angles of the mirrors to the outermost angle at which fusion can be maintained, or until the breaking point is reached. To obtain the vertical fusional amplitude, an effective prism power is introduced vertically, base-up or base-down, by angling the mirrors in said directions until the breaking points are reached.

The above measurements may also be taken with varying degrees of accommodation or with accommodation relaxed by the proper selection of lenses 231 to approximate conditions for distant and near tests.

It is specifically pointed out that in all instances, the total effective prism power, either base-up or base-down, base-in or base-out, is positively recorded during the operation of the machine and that the said effective prism power may be varied during the operation of the machine.

It is also pointed out that with the above described instrument, the flashings may be timed so as to occur at selected points during the swinging or oscillation of the mirrors and that this timing is changeable.

It is also to be understood that although there has been outlined herein certain techniques for obtaining tests, measurements or exercises, other treatments, tests, etc. may be performed or variations of said tests may be carried out. The above outlined techniques, methods of obtaining measurements and treatments have, however, been found very effective and beneficial and are at the present time preferable.

The flashings of the different sources of illumination 129 and 129' have been described as being controllable during the continuously increasing or decreasing of the prism power before the eyes.

This arrangement provides means whereby two distinctive exercises or treatments may be imparted to the eyes. The first of said treatments may be considered the less severe wherein the flashing of the illuminating means for each eye is controlled so that the sources of illumination are illuminated when the minimum prism power is before the eyes and the said illumination is sustained throughout the gradual increasing of the prism power to the maximum prism power at which instance the flashing mechanism turns off the illumination and allows the eyes to return to their position of rest or to a position similar to looking at infinity. During this period the prisms again return to the minimum point at which instance the sources of illumination are illuminated and the eyes are again carried through the treatment. This in effect causes the stress to be gradually increased and thence dropped when the maximum point is reached.

The second treatment is brought about by causing the sources of illumination to be illuminated at the instance of maximum prism displacement, at which point the eyes are called upon instantaneously to overcome the full stress of the treatment and the illumination is sustained throughout the range of gradual decreasing of the prism until a point of relaxation is reached, at which point the illumination is turned off throughout the period of the building up of the prism power to the maximum. The sources of illumination are then again illuminated to cause the eyes to be carried through the same treatment.

This latter method is more of a shock treatment.

It is of course to be understood that the flashing may be controlled so as to occur at different intervals intermediate the minimum and maximum prism displacement if desired, depending, of course, upon the nature of the treatment. For example, the illumination may be turned on at the point of minimum prism power and sustained during the increasing of the prism power to a predetermined amount intermediate the minimum and maximum points, at which point the sources of illumination will be turned off to render the fixation means viewed during said gradual increasing and decreasing of the prism power invisible. This condition, of course, might be reversed if desired.

By the above, it is apparent that there is a direct coordination between the flashing and prism power varying means and that the function of said flashing and prism power varying means may be controlled separately although the said means operate automatically.

It will also be understood that the flashings may be controlled to occur at predetermined instances during the manual varying of the prism power base-up or base-down introduced by tilting the mirrors.

It will be noted that the prism power is continuously increased or decreased, either base-in or out, up or down, without changing the effective position of the base or axis of the prism. This distinguishes from most prior art rotary prism devices which in effect do not increase the prism power before each eye but rotate the bases of the prisms to different axes to change said prisms from a base-in to a base-out position or vice versa. Such devices do not enable the increasing and decreasing of prism power while maintaining the movement of the images displaced by said varying of the prism power along substantially a straight line. Rotary prism type devices, as set forth above, cause the images to move in circular paths.

It is also pointed out that the increasing and decreasing of the prism power of the device embodying the invention is mechanically operated and functions with a smooth operating motion, the speed of which may be positively controlled.

A slot 234 is formed in the top of the instrument to provide means whereby the movements of the eyes may be viewed during the operation of the machine.

From the foregoing description, it will be seen that simple, efficient and economical means and method have been provided for accomplishing all of the objects and advantages of the invention, and more particularly means which may be quickly and accurately adjusted and methods and exercises which may be quickly and accurately performed.

Having described my invention, I claim:

1. In a myologic instrument, two mirrors arranged in angular relation, a test implement for each mirror brought into the field of vision by reflection from the mirror, means for automatically and constantly increasing and decreasing the angular relation of the mirrors in successive movements, and means moved by and with the mirrors for indicating the prism power of the mirrors in any one position thereof.

2. In a myologic instrument, two mirrors arranged in angular relation, a test implement for each mirror brought into the field of vision by reflection from the mirror, means for automatically and constantly increasing and decreasing the angular relation of the mirrors in successive movements, and means for automatically indicating the prism dioptry of the mirrors in any position.

3. A myologic instrument including two mirrors supported for movement relative to a common pivot in divergent relation, test implements brought into the field of vision by reflection from the mirrors, means for automatically and progressively increasing and decreasing alternately the divergence of the mirrors to correct abnormal horizontal balance of vision, and means to selectively incline the pivot to alter the normal horizontal plane of the mirrors to correct abnormal vertical balance of vision.

4. A myologic instrument including two mirrors supported for movement relative to a common pivot in divergent relation, test implements brought into the field of vision by reflection from the mirrors, means for automatically and progressively increasing and decreasing alternately the divergence of the mirrors to correct abnormal horizontal balance of vision, means to selectively incline the pivot to alter the normal horizontal plane of the mirrors to correct abnormal vertical balance of vision, and dioptric scales for measuring each increment of mirror movement.

5. In a myologic instrument, two mirrors arranged for independent movement with respect to a common axis, a test element for each mirror brought into the field of vision by reflection from the mirror, means for automatically and constantly varying the angular relation of the mirrors in regular movement, and means for directly varying the inclination of the axis of the mirrors and thereby changing the respective planes in which they operate.

6. In a myologic instrument, two mirrors mounted in angular relation with respect to a common swingingly mounted pivot, a test element for each mirror brought into the field of vision by reflection from the mirror, means for constantly and regularly varying the inclination of the mirrors for varying the prism power, and means for varying the inclination of the common pivot to change the relative vertical plane of the mirrors.

7. A myologic instrument including two mirrors supported for movement relative to a common point in divergent relation, test implements brought into the field of vision by reflection from the mirrors, means for automatically and progressively increasing and decreasing alternately the divergence of the mirrors to correct abnormal horizontal balance of vision, and means for altering the normal horizontal plane of the mirrors to correct abnormal vertical balance of vision.

8. A myologic instrument including two mirrors supported for movement relative to a common point in divergent relation, test implements brought into the field of vision by reflection from the mirrors, means for automatically and progressively increasing and decreasing alternately the divergence of the mirrors to correct abnormal horizontal balance of vision, means for altering the normal horizontal plane of the mirrors to correct abnormal vertical balance of vision, and dioptric scales for measuring each increment of mirror movement.

9. In a myologic instrument, two mirrors mounted for independent swinging movement from a common point, test implements brought into the field of vision by reflection from both mirrors, a power means, a connection between the power means and each mirror, said connection operating under the power means to swing the mirrors alternately in opposite directions to compel a minimum and maximum limit of mirror divergence in any two successive mirror movements, and means to manually adjust the mirrors relative to each other to selectively predetermine the limit of minimum and maximum divergence of the mirrors during operation of the power means.

10. A myologic instrument comprising two mirrors mounted for independent swinging movement from a common point, test implements brought into the field of vision by mirror reflection, a power means, a connection between the power means and mirrors, said connection comprising operating under the power means to swing the mirrors simultaneously in relatively opposite directions to compel a maximum and minimum limit of mirror divergence in any two successive mirror movements, the variation in mirror divergence serving to vary the prism power to which the vision is subjected, and means for manually adjusting the power means to cause said connections to vary the minimum divergence of the mirrors at will.

11. In a myologic instrument, two mirrors mounted for independent movement from a common point and having a normal minimum divergence when at rest, a test implement for each mirror brought into the field of vision by reflection from the mirror, means for automatically and constantly varying the angular relation of the mirrors in directly successive movement, and means for varying the extent of the mirror movement.

12. In a myologic instrument, two mirrors mounted for independent swinging from a common point, a moving test implement for each mirror brought into the field of vision by reflection from the mirrors, means for automatically and constantly varying the angular relation of the mirrors in directly successive movement to thereby constantly vary the prism power from a minimum to a maximum, and means for varying the speed of mirror movement while maintaining the movement of the test implements constant.

13. An ophthalmic instrument for use with a person's eyes comprising a pair of light deflecting members, one before each eye, a test implement for each light deflecting member brought into the field of vision by deflection resulting from said light deflecting members for aiding the eyes in obtaining single binocular vision of the images of said test implements, means for automatically and constantly increasing and decreasing the angle of deflection of said light deflecting means to alter the relation of the images and means associated with said light deflecting means for indicating the angle of deflection in any one position of displacement of said images.

14. An ophthalmic instrument for use with a person's eyes comprising a separate test implement for each of the respective eyes of the person, means for illuminating said test implements, a pair of light deflecting members, one before each eye, for bringing images of the test implements into the field of vision to aid the eyes in obtaining single binocular vision of said images, means for automatically and constantly increasing and decreasing the angle of deflection of said light deflecting means to alter the relation of the images, means associated with said light deflecting means for indicating the angle of deflection in any one position of displacement of said images and means for turning on and shutting off said illumination at predetermined intervals during said displacement of said images.

15. An ophthalmic instrument for use with a person's eyes comprising a pair of light deflecting members, one before each eye, a test implement for each light deflecting member brought into the field of vision by deflection resulting from said light deflecting means for aiding the eyes in obtaining single binocular vision of the images of said test implements, means for automatically and constantly increasing and decreasing the angle of deflection of said light deflecting means to alter the relation of the images and means associated with said light deflecting means for indicating the angle of deflection in any one position of displacement of said images, and means for moving said test implements in given controlled paths during displacement of the images thereof by the light deflecting members.

WORTHY C. HARPER.